June 26, 1962  A. KURTI  3,040,524
DUCTED FAN ENGINE THRUST REVERSER
Filed July 28, 1961  4 Sheets-Sheet 1
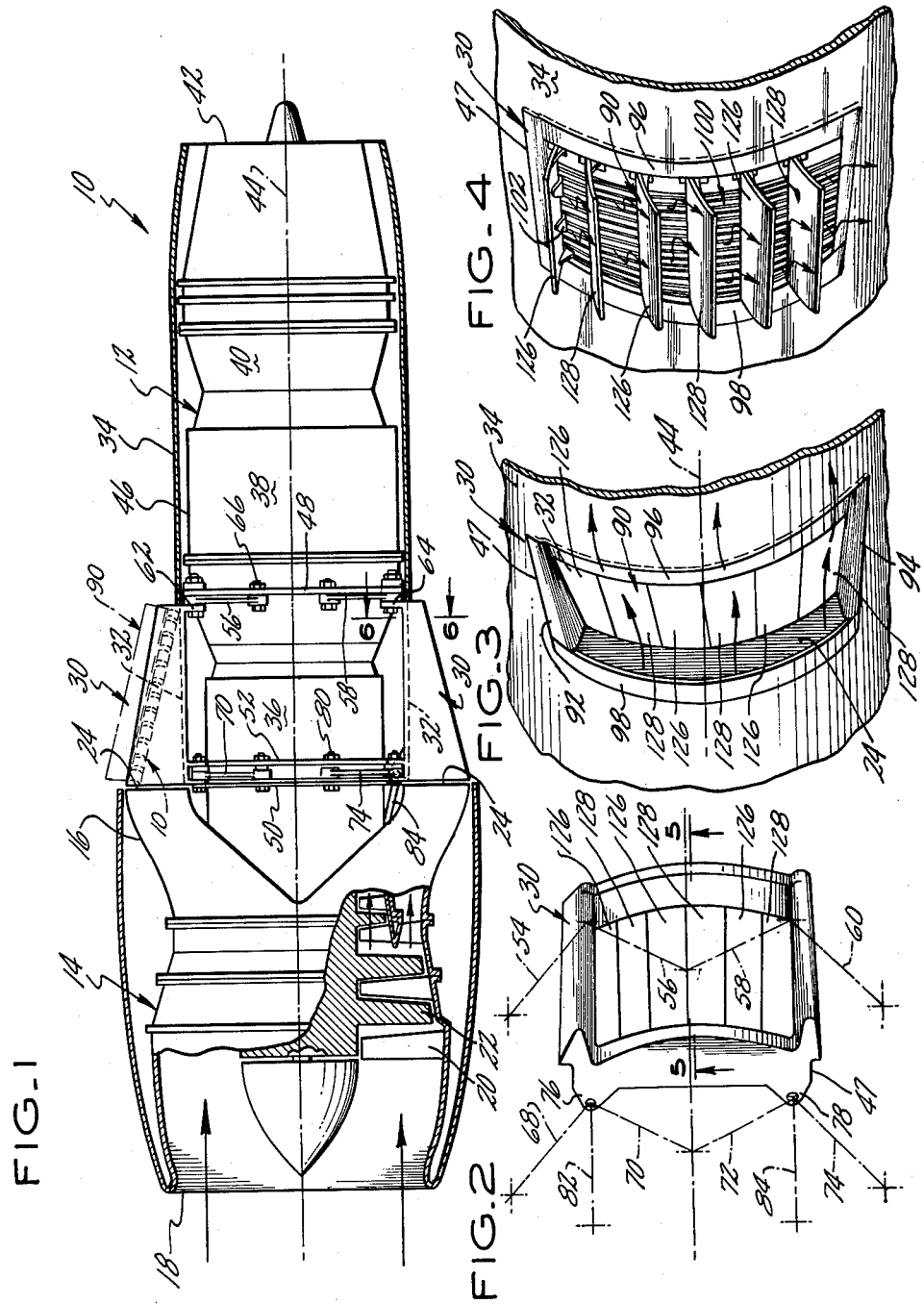
INVENTOR
ALEXANDER KURTI
BY Vernon F. Hauschild
ATTORNEY

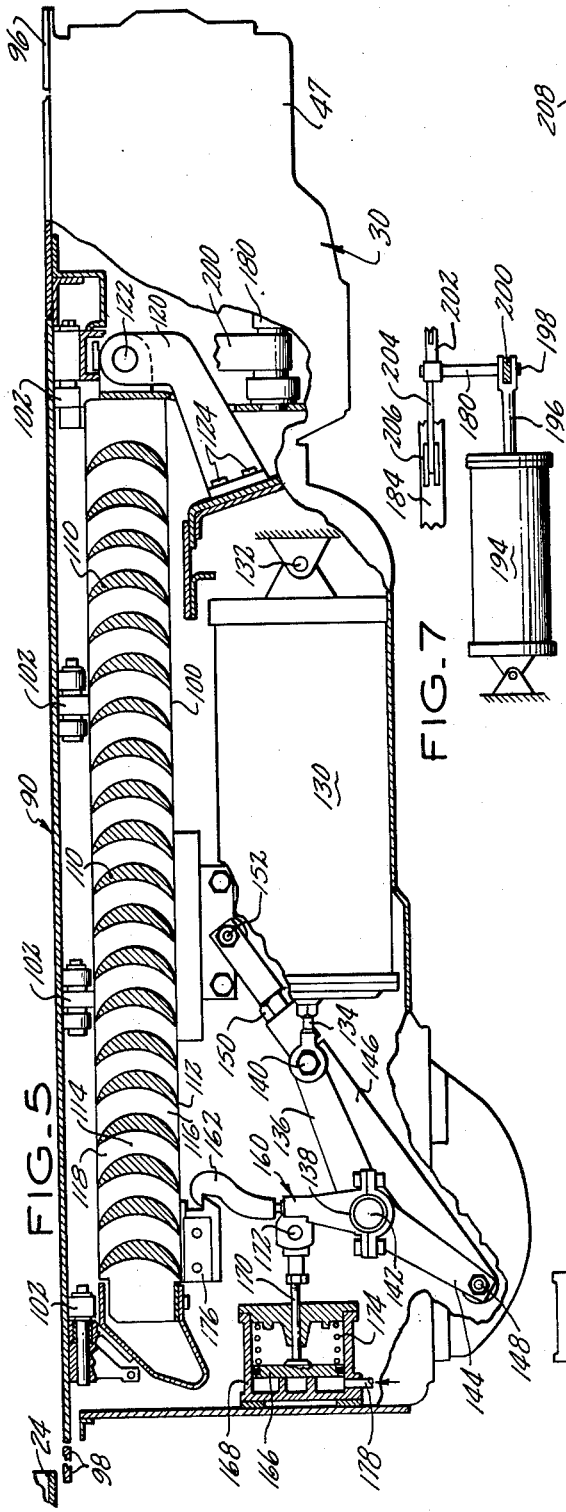
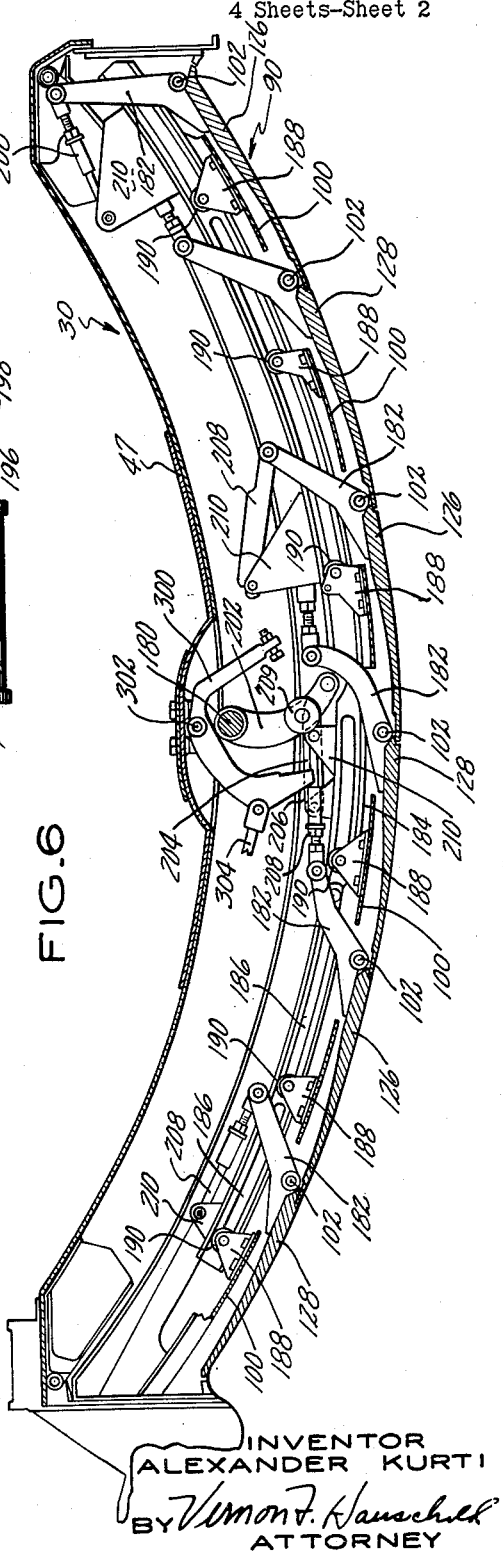

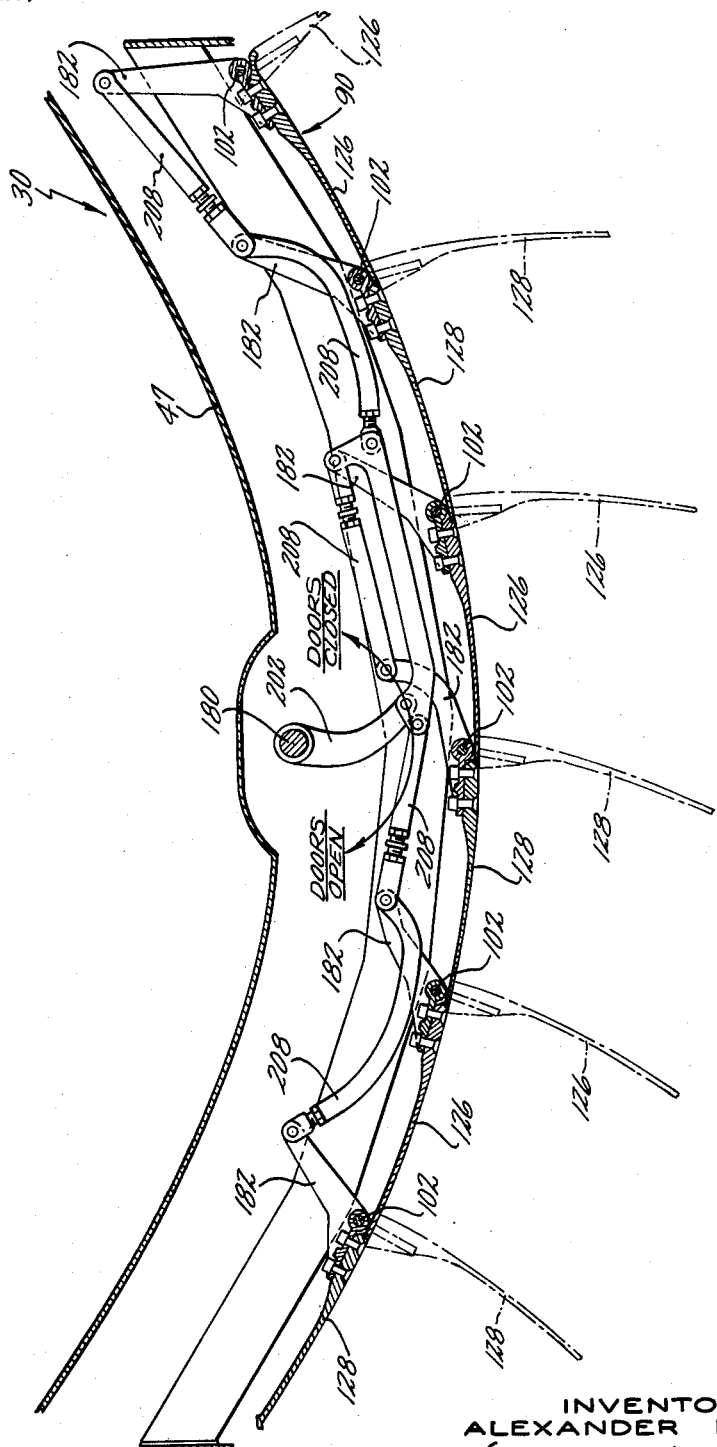

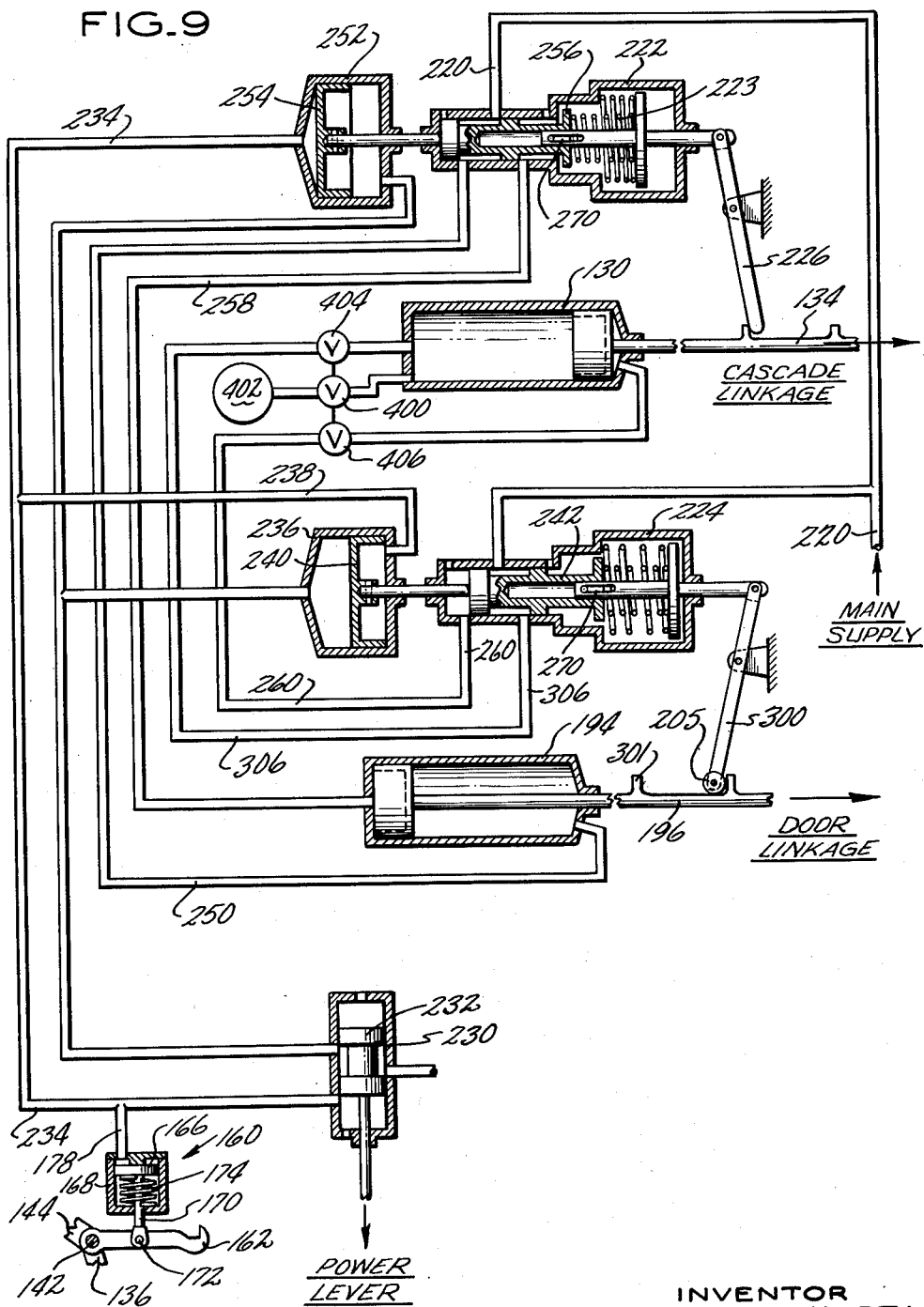

United States Patent Office 3,040,524
Patented June 26, 1962

3,040,524
DUCTED FAN ENGINE THRUST REVERSER
Alexander Kurti, West Hartford, Conn., assignor to United Aircraft Corporation, East Hartford, Conn., a corporation of Delaware
Filed July 28, 1961, Ser. No. 127,580
10 Claims. (Cl. 60—35.54)

This invention relates to turbofan engines and more particularly to turbofan engines in which the fan air is discharged to atmosphere through circumferential slots positioned a substantial distance forward of the engine exhaust gas outlet and still more particularly to thrust reversal mechanism for use with the fan discharge air.

In a conventional turbofan engine, a shroud envelops the entire turbojet engine defining an annular fan air passage therewith, which passage culminates in a plane parallel with the normal engine exhaust outlet. Accordingly it is possible to reverse the flow of fan air with the thrust reverser used to reverse the flow of engine exhaust gases. The type of thrust reverser shown in U.S. Patent No. 2,943,443 may be used for this purpose.

This type of thrust reverser will not suffice for use with a turbofan engine in which the fan air is discharged to atmosphere through one or more circumferentially extending slots a substantial distance forward of the engine exhaust gas outlet, in fact, in most instances a substantial distance forward of the center point in the length of the engine.

It is an object of this invention to teach a thrust reverser for use with a turbofan engine whose fan air is discharged to atmosphere through one or more circumferentially extending slots which are positioned a substantial distance forward of the engine exhaust gas outlet.

It is still a further object of this invention to teach a thrust reverser for use with such a turbofan engine which utilizes both a pivotal vane cascade and a plurality of pivotal doors attached thereto and movable therewith.

It is still a further object of this invention to teach a thrust reverser for use with such a turbofan engine wherein all thrust reversal parts are physically contained within a thrust reversal unit which is shaped to fit between the engine case and the nacelle and which defines a smooth surface extending rearwardly from said fan air exhaust nozzle and which smooth surface is cylindrical with respect to the engine axis in a downstream direction such that the fan air passes rearwardly over this cylindrical smooth surface and is directed thereby away from the fairing or nacelle downstream of the thrust reverser. This thrust reversal unit is also movable to an operative position wherein said vane cascade traverses or passes across the slot-shaped fan air outlet and a door plurality opens to permit the fan air to pass through the vane cascade and thereby have its direction of flow change from an axial direction to a substantially radial direction.

It is a further object of this invention to teach a thrust reversal unit for use with such an engine which includes an inflight lock such that said vane cascade may be locked in position as is said door plurality during normal aircraft flight operation.

It is still a further object of this invention to teach a thrust reverser for use with such a turbofan engine so controlled that said door plurality must open before said vane cascade moves from its retracted or stowed position to its open or thrust reversal position and further wherein said vane cascade must pivot from its operable to its retracted position before said door plurality may close.

It is still a further object of this invention to teach a thrust reversal for use with such a turbofan engine wherein said door plurality is caused to actuate by pivotal links forming parallelograms with the doors.

It is still a further object of this invention to teach a thrust reversal for use with such a turbofan engine which is pneumatically operated or actuated.

Other objects and advantages will be apparent from the specification and claims and from the accompanying drawings which illustrate an embodiment of the invention.

FIGURE 1 is a top view of a turbofan engine wherein the fan air is discharged to atmosphere through circumferentially extending slots positioned at the three o'clock and nine o'clock positions and substantially forward of the engine exhaust gas outlet and which is partially broken away to illustrate both fan operation and the position and attachment of my thrust reverser units.

FIGURE 2 is a schematic representation of one of my thrust reversal units to illustrate schematically the way that the unit is detachably detached from the unit housing.

FIGURE 3 is a perspective showing of my thrust reversal unit in its retracted, inoperative or stowed position.

FIGURE 4 is a perspective showing similar to FIGURE 3 but with my thrust reversal in its operative or thrust reversal position.

FIGURE 5 is a view taken along line 5—5 of FIG. 2 showing one of my thrust reversal units partially broken away and partially in cross section to illustrate the actuating mechanism for my vane cascade and to further illustrate my in-flight lock.

FIGURE 6 is a view taken along line 6—6 of FIG. 1 showing my thrust reverser unit partially broken away to illustrate the actuating mechanism for my door plurality.

FIGURE 7 is a schematic showing of a portion of my door plurality actuating mechanism.

FIGURE 8 corresponds to FIGURE 6 and shows an alternate arrangement for actuating my door plurality.

FIGURE 9 is a schematic showing of my thrust reversal sequencing control mechanism.

Referring to FIG. 1 we see turbofan engine 10 which comprises, in part, conventional turbojet engine 12 and a fan section 14. For purposes of illustration, fan section 14 is shown herein to culminate in a bifurcated duct 16 but it should be borne in mind that it could well culminate in any of one or more circumferentially extending slots.

Air enters my turbofan engine 10 through air inlet 18 and is compressed in passing through the fan stators 20 and the fan rotating blades 22. A portion of the air so compressed then flows through bifurcated duct 16 and out circumferentially extending slots 24 for discharge to atmosphere to perform a thrust generating function. When my thrust reverser units 30 are in the stowed or inoperative position, shown in phantom along line 32 of FIG. 1, it will be seen that the fan air discharged through exhaust nozzle slots 24 is discharged to atmosphere unimpeded and flows over smooth, cylindrical surface 32 so that it is directed rearwardly. The remainder of the air which is compressed by fan vanes 20 and fan blades 22 passes into compressor section 36, wherein it is further compressed and then into burner section 38 to have heat added thereto and then into turbine section 20 where sufficient energy is extracted therefrom to drive compressor 36 and fan blades 22 and is then discharged to atmosphere through exhaust nozzle outlet 42. Engine 10 is concentric about centerline or axis 44 and engine housing 46, which is of circular cross-section and concentric about axis 44, envelops compressor section 36, burner section 38 and turbine section 40.

It will be obvious to those skilled in the art that engine 10 could as well include an afterburner of the type shown in U.S. Patent No. 2,974,486 downstream of turbine section 40. It is believed that the foregoing constitutes sufficient description of my turbofan engine 10 to permit full disclosure of my thrust reverser and further details of turbofan engine 10 may be had by referring to U.S. patent application, Serial No. 720,961 on improvements in Ducted Fan Engine by Thomas A. Briggs, while further details of turbojet engine 12 may be had by referring to U.S. Patent Nos. 2,711,631 and 2,747,367.

While my thrust reverser unit 30 is very schematically shown in its operative position in solid lines in FIG. 1 and in its inoperative position in phantom in FIG. 1, this is purely to illustrate that the thrust reverser can be retracted so as not to interfere with turbofan air discharge or may be pivoted into its FIG. 1 solid line position to traverse or pass across the turbofan discharge air stream so as to reverse the direction of flow thereover. This thrust reversal unit 30 will be described in greater particularity hereinafter.

Referring to FIG. 2 we see my thrust reversal unit 30 in its entirety. Thrust reverser unit 30 is curved circumferentially to nest between fairing or nacelle 34 and engine case 46. Contoured housing 47 contains all of the movable parts of my thrust reversal unit 30 and is attached to engine case 46, as shown in FIGS. 1 and 2, and more particularly to mounting ring flanges 48, 50 and 52 thereof. Pivotally connecting links 54, 56, 58 and 60 are pivotally connected to rear brackets such as 62 and 64 on contoured housing 47 and are also pivotally attached to mounting ring 48 by any convenient means such as bolt and nut units 66 so as to attach to engine case 46 and thereby circumferentially and radially position the after or downstream end of my thrust reversal unit 30. Pivotal links 68, 70, 72 and 74 pivotally attached to front brackets 76 and 78 and also pivotally attached to axially spaced ring flanges 50 and 52 by any convenient means such as nut and bolt arrangement 80 to circumferentially and radially position the forward or upstream end of my thrust reverser unit 30. Forwardly extending links 82 and 84 are connected to both thrust reverser unit brackets 74 and 78 and to the engine case 46 and serve to axially position my thrust reverser unit 30. Accordingly, by the disconnecting of these links from either unit 30 or engine case 46, unit 30 may be removed. It will be noted that one thrust reverser unit 30 is positioned immediately downstream of each bypass air exhaust nozzle outlet 24. Since the bypass engine illustrated in FIG. 1 is of the bifurcated duct type two thrust reversal units 30 are shown therewith.

FIGS. 3 and 4 show in perspective my thrust reverser unit 30 in its inoperable and operable positions, respectively. In both FIGS. 3 and 4 it will be noted that my thrust reversal unit 30 is embedded in nacelle 34 and is attached to engine housing 46 in the fashion just described. Referring to FIG. 3, we see that with my thrust reversal unit 30 in its inoperative or stowed position the fan discharge air may pass freely through circumferentially extending slot 24 to atmosphere over smooth surface 32 defined by door plurality 90. It will be noted that smooth surface 32 is cylindrical with respect to engine centerline or axis 44 and that the side panels 92 and 94 of contoured housing 47 are deeper or of greater radial dimension at their forward or upstream ends than at the after or downstream ends wherein they blend smooth with downstream frame 96, whereas, they cooperate with upstream frame 98 and the door plurality 90 to define slot-shaped exhaust nozzle 24.

FIGURE 4 is the same perspective showing as FIG. 3 but with my thrust reverser unit 30 in its operative or thrust reverser position wherein the vane cascade 100 has pivoted outwardly about its after end so that the vanes traverse or extend laterally across slot outlet 24 to intercept the rearwardly discharged fan air and change its direction of flow to at least a radial direction and preferably to a substantially forward direction for thrust reversal purposes. To permit such passage of fan air through vane cascade 100, the door plurality 90, which is attached to vane cascade 100 by axially aligned hinges such as 102, have pivoted so as to extend substantially radially.

Referring to FIG. 5 we see my thrust reverser unit 30 in greater particularity enclosed within contoured housing 47. It will be noted that vane cascade 100 includes a plurality of axially spaced vanes 110 which when pivoted to their operable position shown in solid lines in FIG. 1 and in perspective in FIG. 4 will intercept the fan discharge air from slot nozzle 24 at the leading edges 112 and will cause the discharge fan air to pass through passages 114 defined therebetween, which passages, when cascade 100 is in its operable position, are substantially axially directed and circumferentially extending at forward section 116 and which are also circumferentially extended and at least radially directed at the after section 118 thereby reversing the direction of flow of fan discharge air. Cascade 100 is pivotally attached to bracket 120 by pivot bolt 122 while bracket 120 is attached to contoured housing 47 by any convenient means such as bolts 124. The door plurality 90 comprises a number of axially extending and circumferentially positioned doors such as 126 and 128 (FIG. 4) each of which is pivotally connected to vane cascade 100 by axially aligned hinges 102. Vane cascade 100 is caused to pivot outwardly about pivot bolt 122 by the action of pneumatic cylinder unit 130 which is pivotally connected to contoured housing 47 at pivot point 132 and which has connecting arm 134 extending forwardly therefrom for reciprocation with pneumatically actuated piston within unit 130. Reciprocating link 134 is pivotally connected to throw arm 136 of crankshaft 138 by connecting bolt 140. Crankshaft 138 is supported in conventional fashion within housing 47 so as to be pivotable about crankshaft axis 142. A second throw arm 144 extends from crankshaft 138 for rotation therewith and is pivotally connected to connecting link 146 by pivot bolt 148. Connecting link 146 which may be adjustable in length by adjustable mechanism 150 is pivotally connected to vane cascade 100 by connecting bolt 152. Due to the just described pivotal connections the forward motion of actuated rod 134 causes counterclockwise rotation of crankshaft 138 and its throw arms 136 and 144, thereby moving connecting link 146 so as to cause vane cascade 100 to pivot outwardly about connecting bolt 122 into its extended, operative or thrust reversal position shown in solid lines in FIG. 1 and perspectively in FIG. 4. The rearward reciprocation of actuating link 134 will cause a clock-wise rotation of shaft 138 and the pivoting of vane cascade 100 inwardly about connecting bolt 122 to the stowed or inoperative position illustrated in FIGS. 3 and 5.

Still referring to FIG. 5 it will be noted that in-flight lock mechanism 160 extends from and is loosely pivotally attached to crankshaft 138. In-flight lock mechanism 160 includes hook mechanism 162 which is pivotally connected to crankshaft 138, by connecting arm 164. Pneumatic piston 166, which is located within cylinder 168 is connected pivotally to rod 164 by adjustable connecting arm 170 at pivot point 172. Piston 166 is biased by spring 174 to the position shown in FIG. 5 wherein in-flight hook 162 conects to mating bracket 176 of vane cascade 100 thereby locking vane cascade 100 in its inoperative or stowed position. When thrust reversal unit 30 is to be used, pressurized air is introduced into cylinder 168 through conduit 178 thereby overpowering spring 174 and forcing piston 166 toward crankshaft 138 thereby pivoting hook 162 in a clockwise direction to free bracket 176 and hence cascade 100. Pneumatic power may be provided to piston 166 by any convenient means such as a pilot actuated lever attached to appropriate valving, not shown. Further, as shown in FIG. 9, in-flight lock mechanism 160 may be pneumatically actuated by connecting line 234 to cylinder 168.

The mechanism for actuating door plurality 90 will not be described and it is located in the far right portion of FIG. 5 and includes crankshaft 180, which is mounted in conventional fashion for rotation within contoured housing 47.

The door plurality actuating mechanism is shown in greater particularity in FIGS. 6 and 7 to which reference will not be made. In FIG. 6 we see door plurality 90 which is shown herein to comprise six doors such as 126 and 128 which are axially extending between the front frame 98 and rear frame 96 and connected to vane cascade 100 by axially aligned hinges 102. The door such as 126 and 128 overlap slightly so as to form smooth exterior surface 32 when in the retracted FIG. 6 position. Each door has at least one and preferably two link arms 182 integrally attached thereto and extending therefrom for pivot action therewith about hinges 102. A track member 184, which is of I shaped cross section and which may be of one or more joined pieces, is curved to the curvature of doors 90 and mounted for circumferential movement therewithin. The track member 184 includes centrally located circumferential slots such as 186 which receive rollers or pins extending therethrough from bracket members 188, which are integrally attached to cascade 100. Preferably, anti-friction bearings 190 are supported by bracket members 188 for rotation and received in the lateral recesses of the I shaped track member 184 for support purposes. Track member 184 is caused to reciprocate circumferentially by the rotation of crankshaft 180 which is supported for rotary motion in contoured housing 47 in conventional fashion and which, as best shown in FIG. 7, is caused to rotate by the action of pneumatic cylinder-piston unit 194 which causes connecting link 196 to reciprocate. Connecting link 196 is pivotally attached by pivot bolt 198 to throw arm 200 of crankshaft 180 such that the reciprocation of connecting arm 196 by cylinder-piston unit 194 causes the rotation of crankshaft 180 and its two throw arms 200 and 202. Throw arm 202 is shown in FIG. 6 and is pivotally attached to link 204 which is in turn pivotally attached to bracket 206, which is integrally attached to track member 184. Accordingly, the action of cylinder-piston unit 194 causes crankshaft 180 to rotate and hence track unit 184 to reciprocate circumferentially within my thrust reversal unit. Links such as 208 are pivotally connected to door arms 182 and also to track member 184 by brackets such as 210 which are integrally attached to track member 184. Due to this mechanical interconnection, pneumatic cylinder-piston unit 194 acts through crank shaft 180 and member 184, brackets 210 and connecting links 208 to cause door link arms 182 and hence the door plurality 90 to pivot about hinges 102 thereby causing the doors such as 126 and 128 of the door plurality 90 to open to the FIG. 4 thrust reverser position and close to the FIG. 3 and 6 stowed position.

Referring to FIG. 8, we see an alternate embodiment of my door actuator mechanism which is similar to the configuration shown in FIG. 6 and which includes crankshaft 180 and pivot arms 208 to cause the door plurality 90 to pivot about the axially extending hinges 102. This embodiment differs from the FIG. 6 construction in that the doors of plurality 90 cooperate with the door arms or links 182 and connecting links 208 to define parallelograms of linkages to actuate the door plurality 90. In view of the previous description given for FIG. 6, it will be obvious that the FIG. 8 construction successfully eliminates the track member 184 due to this parallelogram linkage arrangement and that the rotation of crankshaft 180 will cause the circumferential reciprocation of connecting links 208 and hence the pivotal action of the door plurality 90 and its door links 182 to open and close the doors of the door plurality 90.

In my thrust reverser mechanism it is necessary that the door plurality 90 be opened before the cascade 100 is swung into the path of the discharge fan air and that the door plurality 90 remain open until the vane cascade 100 returns to its stowed position, otherwise the doors of the door plurality will probably be blown free of hinges 102. The control mechanism to accomplish this desired result is best shown in FIG. 9 wherein a pneumatic air supply which may either be from a compressed air storage tank or air pressurized by the compressor section 36 of bypass engine 10 is admitted through line 220 to spring biased sequencing valves 222 and 224 which are attached by fulcrum type linkage 226 and 300 to cascade actuating cylinder-piston unit 130 and door plurality actuating cylinder-piston unit 194, respectively.

The air from a pneumatic source, such as compressor 36 air, is also introduced into cylinder 230 which contains pilot actuated pilot valve 232. With the pilot valve 232 in its lower position (not shown) air from cylinder 230 passes through line 234 and into cylinder 236 through line 238 to move piston 240 leftwardly. Piston 242 of door actuated sequence valve 224 will remain in the same position shown since it is separate from piston 240. The compressed air from line 234 also passes into cylinder 252 to force piston 254 rightwardly and hence force piston 256 of servo valve 222 rightwardly by compressing spring 223 without moving link 226 to join line 220 to line 258 thereby forcing the piston of cylinder-piston unit 194 rightwardly to open the door plurality 90. The last part of the rightward movement of door plurality connecting rod 196 causes a counterclockwise motion to fulcrum link 300 when roller 205 is contacted by lug 301, to force the piston 242 of servo-valve 224 leftwardly by spring action thereby connecting line 220 to line 260 through servo-valve 224 to force cascade actuating cylinder-piston unit 130 leftwardly to open the cascades. This leftward movement of the piston of cylinder-piston unit 130 will permit spring loaded link 226 to pivot clockwise. It will be noted that due to the presence of lost motion mechanism 270 in both sequencing servo valve 220 and 224, piston members 242 and 246 may be moved by piston members 254 and 240 without the movement of the pistons of cylinder-piston units 130 and 194. To bring the thrust reversal unit 30 to its stowed or inoperative position the reverse procedure is used as shown in FIG. 9. This reverse procedure is instigated by pilot movement of valve 232 to the position shown in FIG. 9.

Emergency valve 400, which may be pilot operated, ducts a separate pressure supply from source 402 into cylinder-piston unit 130 to stow the cascade 100. Valve 400 also actuates valves 404 and 406 to isolate cylinder-piston unit 130 from the rest of the control system.

It is to be understood that the invention is not limited to the specific embodiment herein illustrated and described but may be used in other ways without departure from its spirit as defined by the following claims.

I claim:

1. In a turbofan engine of substantially circular cross section concentric about an axis, and having a turbine driven compressor which compresses air for discharge to atmosphere through an engine exhaust gas outlet to generate thrust and including a fan section through which compressed gases are discharged to atmosphere through a rearward directed circumferentially extending slot located a substantial distance forward of said engine exhaust gas outlet, a cascade of axially spaced, circumferentially extending vanes positioned immediately rearwardly of said discharge slot and being of substantially the same circumferential dimension thereas, said cascade being pivotal about its after end between a retracted position wherein said cascade is positioned radially inward of said slot and an operable position wherein said cascade extends radially across said slot with said vanes defining a plurality of axially spaced, circumferentially extending gas passages which are substantially axially extending at their forward ends and substantially radially extending at their after ends, and a plurality of axially extending doors circumferentially spaced along said cascade and pivotable between a retracted position wherein said doors extend circumferentially and provide a smooth covering over said cascade and an operable position wherein said doors extend substantially radially so that flow is permitted through said gas passages.

2. Apparatus according to claim 1 wherein said fan section defines two diametrically opposed exhaust nozzles in the form of rearwardly directed, circumferential slots through which the fan compressed gases are discharged to atmosphere, and which fan exhaust outlets are positioned substantially forward of the engine exhaust outlet and wherein a vane cascade and a door plurality are positioned immediately rearward of each said slot-shaped exhaust nozzle.

3. Apparatus according to claim 2 wherein the vane cascade and door plurality downstream of each slot-shaped exhaust nozzle is part of a thrust reversal unit detachably attached to said turbo-fan engine so as to be readily removable therefrom.

4. Apparatus according to claim 3 wherein said thrust reversal unit includes a contoured housing which is attached to said engine and to which said vane cascade is pivotally attached and wherein said doors are pivotally attached to said vane cascade.

5. Apparatus according to claim 4 including vane cascade actuating mechanism located in said thrust reversal unit housing and comprising a crankshaft having at least two throw arms and further comprising a pneumatically powered actuating piston pivotally connected to one of said throw arms and still further comprising a connecting link pivotally connected to both the other of said throw arms and said vane cascade such that reciprocation of said actuating piston produces pivot motion of said vane cascade through coaction with said crankshaft.

6. Apparatus according to claim 5 including actuating mechanism for said door plurality located in said thrust reversal unit housing and comprising link arms extending from each of said doors and a movable track member mounted for circumferential motion on said cascade, means pivotally connecting said link arms to said track member, and means causing said track member to reciprocate circumferentially thereby opening and closing said doors.

7. Apparatus according to claim 6 including sequencing means cooperable with said cascade and said door plurality actuating mechanism so that said vane cascade actuating mechanism is prevented from moving said vane cascade into said vane cascade operable position until said doors are in said door plurality operable position and further preventing said door plurality actuating mechanism from actuating said doors to said door plurality retracted position until said vane cascade actuating mechanism has actuated said vane cascades to said vane cascade retracted position.

8. Apparatus according to claim 7 and including a vane cascade in-flight lock having attachment mechanism which is pivotally connected to said cascade actuating mechanism crankshaft and which is actuated by a spring biased pneumatic cylinder to a locked position wherein said attachment mechanism engages said vane cascade in said vane cascade retracted position to so lock the position of said cascade position and which cylinder is pneumatically actuated to disengage said attachment means from said vane cascade.

9. Apparatus according to claim 6 wherein said door actuating mechanism comprises a plurality of pivotally connected links which form a parallelogram of links to actuate each of said doors.

10. Apparatus according to claim 7 including independent emergency means for actuating said cascade to said retracted position.

References Cited in the file of this patent

UNITED STATES PATENTS

| | | |
|---|---|---|
| 2,637,164 | Robson et al. | May 5, 1953 |
| 2,797,548 | Marchal et al. | July 2, 1957 |

FOREIGN PATENTS

| | | |
|---|---|---|
| 1,221,308 | France | Jan. 11, 1960 |
| 739,500 | Great Britain | Nov. 2, 1955 |